United States Patent [19]

Best

[11] E Re. 31,007

[45] Reissued Aug. 10, 1982

[54] ROOF CONSTRUCTION AND METHOD THEREOF

[75] Inventor: John S. Best, deceased, late of Midland, Mich., by Dow Chemical Company

[73] Assignee: The Dow Chemical Company, Midland, Mich.

[21] Appl. No.: 930,439

[22] Filed: Aug. 2, 1978

Related U.S. Patent Documents

Reissue of:

[64] Patent No.: 3,411,256
Issued: Nov. 19, 1968
Appl. No.: 495,847
Filed: Oct. 14, 1965

[51] Int. Cl.[3] ..... E04B 1/80; E04B 7/00

[52] U.S. Cl. ..... 52/408

[58] Field of Search ..... 52/415, 58, 60, 384, 52/408

[56] References Cited

U.S. PATENT DOCUMENTS 2,019,647 11/1935 Basten .
2,191,522 2/1940 Eckert .
3,266,206 8/1966 Cosby et al. ..... 52/309
3,282,008 11/1966 Sheahan ..... 52/309

OTHER PUBLICATIONS

Report of Building Research Institute Plastics Study Group Fourth Meeting, Sep. 17–18, 1957, Published Oct. 1957 by National Academy of Science, Washington, D. C.
Popular Science, Dec. 1955, pp. 81, 82, 83.
Architectural Record, Apr. 1956, p. 265.
Built Up Roofing Manual: Publication of Barrett Divided/Allied Chemical Corporation, 1962, pp. 1–7 relied upon.

*Primary Examiner*—John E. Murtagh

[57] ABSTRACT

A roof is prepared wherein the water barrier layer is placed on a roof deck and waterproof thermal insulation is placed over the water barrier layer. The water barrier layer is not subjected to the extremes of temperature that are encountered when the water barrier layer is the outermost element of the roof structure.

2 Claims, 2 Drawing Figures

ROOF CONSTRUCTION AND METHOD THEREOF

Figure 1:
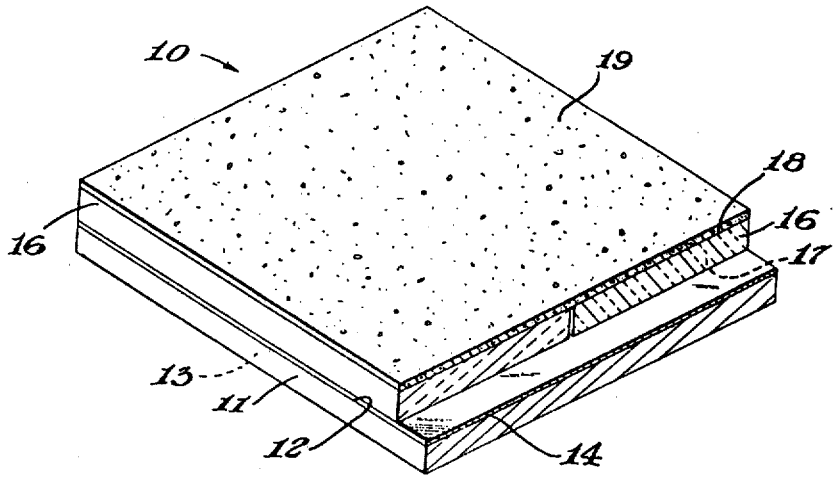

Matter enclosed in heavy brackets [ ] appears in the original patent but forms no part of this reissue specification; matter printed in italics indicates the additions made by reissue.

This invention relates to roof construction and a method for the construction of roofs, and more particularly relates to insulated roofs and their construction.

Built-up roofing has been employed for many years, wherein a roof deck supports a weatherproof membrane where often the weatherproof membrane comprises a plurality of felt and bitumen layers which prevent the penetration of moisture of the roof deck. Oftentimes it is desirable that such a roof be insulated and various insulating materials and methods have been utilized to accomplish this end. For example, oftentimes insulation is positioned below the roof deck on the interior of the building between rafters or similar roof deck support means. Frequently an insulating body such as cellular glass, fiber board, plastic foams and the like are positioned on the upper surface of the roof deck and subsequently covered with alternating layers of felt and bitumen to provide a water resistant membrane. Gravel or like material is then spread upon the roof to provide protection from the sun. Considerable difficulty, over many years, has been encountered with such built-up roof. Cracking of the water impermeable membrane often occurs and is probably due to the loss of volatile components from the bituminous material. Direct damage from foot traffic, condensation during cold weather on or about the roof deck, on the underside toward the building, are some of the many causes of failure of this type of roof.

It would be beneficial if there were available, an improved roof structure and a method of preparing such a roof structure which would preserve the integrity of the water barrier, or barrier membrane.

Further it would be advantageous if there were available a simplified roof structure and method of forming such a roof structure having improved properties.

These benefits and other advantages, in accordance with the present invention, are achieved in a roof structure which comprises a roof support means or roof deck having an upper surface and a lower surface, a water barrier membrane disposed adjacent the roof deck on the upper side thereof, a layer of thermal insulation, the layer of thermal insulation comprising closed celled water impervious cellular insulating material secured to the roof membrane.

Also contemplated within the scope of the present invention is a method of preparing a roof comprising disposing upon the upper surface of a roof deck a water impermeable membrane, disposing upon the membrane a closed cell water impermeable insulating foam.

Further features and advantages, of the present invention, will become more apparent from the following specification in connection with the drawing wherein:

FIG. 1 schematically depicts an isometric view of a cutaway roof structure; and

Figure 2:
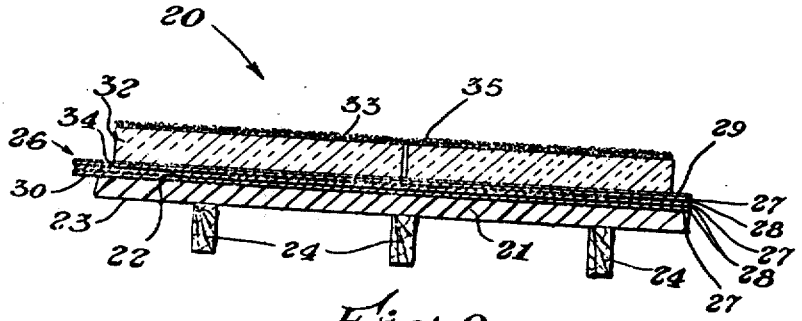

FIG. 2 is a sectional view of an alternate embodiment of the present invention.

In FIG. 1 there is illustrated a schematic, isometric representation of a roof structure, generally in accordance with the present invention, designated by the reference numeral 10. The roof structure 10 comprises in cooperative combination a roof deck 11. The roof deck 11 has an upper surface 12 and a lower surface 13. The water impermeable membrane is secured to the upper surface 12 of the roof deck 13. Beneficially the water impermeable membrane 14 may comprise a plurality of alternating layers of felt and a bituminous material. A thermal insulating layer 16, having a lower surface 17 and an upper surface 18, is adhered to the surface of the water impermeable membrane 14 remote from the roof deck surface 12. The thermal insulating layer 16 is of closed cell configuration and is water resistant and water impermeable. A protective layer 19 is disposed on the surface 18 of the thermal insulating layer 16.

An alternate embodiment of the invention is depicted in FIG. 2 and is generally designated by the reference numeral 20. The embodiment 20 comprises a roof deck 21 having an upper surface 22 and a lower surface 23. The roof deck 21 is supported by a plurality of rafters 24 in engagement of the lower surface 23 of the deck 21. A water impermeable membrane 26 is disposed on the surface 22 of the deck 21. The membrane 26 comprises a plurality of alternating layers of felt 27 and layers of the bituminous material 28, wherein upper and lower surfaces 29 and 30, of the membrane 26, are bituminous material. A thermal insulating layer 32 is adhered to the upper surface 29 of the water impermeable membrane 26. The thermal insulating layer 32 has an upper surface 33 and a lower surface 34. The lower surface 34, of the layer 32, is firmly embedded in the bituminous upper surface 29 of the membrane 26. A protective layer 35 is disposed on the upper surface 33 of the thermal insulating layer 32, and the protective coating 35 comprises particulate siliceous gravel.

A wide variety of materials may be employed in the preparation of roofs, in accordance with the roof and the method of the present invention. The roof deck or roof support means may be prepared from steel, wood, laminated wood, cardboard, cement, asbestos board, planking and the like. The roof deck may be supported in any convenient manner such as being firmly affixed to the rafters by means of nails, screws or bolts. The roof decking may be of panels and readily inserted into suitable recesses in a framework and prepared by like methods well known to the art. The water impermeable membrane may comprise or consist of a wide variety of water impermeable materials including conventional asphaltic and bituminous compositions employed for roofing as well as laminates of the bituminous material with fibrous products such as roofing felt employing organic or inorganic fibers. Beneficially such felt and bituminous materials may be applied in alternating layers to provide a water impermeable membrane of the desired thickness and mechanical strength to resist movement of the roof deck and associated supporting structure. In certain instances, a water impermeable membrane can be formed of synthetic thermoplastic resinous film or sheet such as polyethylene, polyvinyl chloride and the like which is adhered to the roof deck by a suitable adhesive. One or more layers of such material may be employed depending on the characteristics which are desired from the finished structure.

The thermal insulating layer, employed in the practice of the present invention, beneficially is a closed cellular material which is substantially water impermeable. Particularly beneficial and advantageous, for use in the present invention, are cellular plastic foams of a closed cell configuration including styrene polymer foams, styrene-acrylonitrile copolymer foams, styrene-methylmethacrylate copolymer foams, polyvinyl chloride foams, polyethylene foams and other water impermeable materials available in cellular foam form which are well known to the art. Foam glass is particularly advantageous when it is desired to omit a protective layer over the thermal isulating material. A protective layer beneficially is employed when synthetic resinous organic cellular thermal insulating layers are utilized. Such organic materials are generally subjected to decomposition when exposed to weather and more particularly when exposed to sunlight. Therefore, it is advantageous to place a protective layer on the outside surface of thermal insulating layer.

Beneficially such a protective layer may comprise or consist of a particulate inorganic material such as gravel, spread over the foam layer or, if desired, relatively thin weather and sunproof protective coating is readily provided by employing an inorganic mortar such as is formed from a mixture of portland cement and sand, and is spread thinly upon the surface of the insulating layer in such a manner as is to provide protection from the sun and the weater. In certain instances, depending on weather conditions and pitch of the roof, it may be desirable to provide an intermediate or bonding layer to adhere the protective layer to the thermal insulating layer.

In preparation of roof structures, in accordance with the present invention, usually the water resistant membrane is applied to the roof deck, for example by applying a layer of bituminous material thereto, applying a suitable roofing felt to the bituminous material and providing the repeated applications of roofing felt and bituminous material until a suitable membrane is formed.

Advantageously the thermal insulating layer is joined to the water impermeable membrane by the use of the same or different bituminous composition employed in preparing the water resistant membrane while the bituminous material is in a heat plastified condition, pressing planks or sheets of the heat insulating material into the bituminous layer to provide a suitable bond. When employing a heat insulating layer of a thermoplastic synthetic resinous material it is necessary that the bituminous material not have a temperature sufficiently high to destroy a large portion or proportion of the cellular insulating material. For example, when foamed polystyrene sheets are utilized as the heat insulating layer, it is generally desirable that the bituminous material have a temperature not greatly in excess of about 100° centigrade, in order that undue distortion or melting of the polystyrene foam insulating material occur. It is essential and critical, to the practice of the present invention, that the insulating layer be of a closed cell configuration. The particular density or physical strength of such an insulating material need only be sufficient to meet the mechanical demands of the particular installation. Generally, foamed polystyrene sheets having a density of about 1.5 pounds per cubic foot are adequate for roof installations which are not subject to heavy foot traffic. If lower density and lower physical strength closed cell foamed materials are employed as the insulating layer, it is often desirable to provide the protective layer of sufficient strength to resist mechanical damage. Thus, in a region where little or no foot traffic is expected on a roof, a loose gravel coating is applied directly over the closed cell thermal insulated layer and provides adequate protection, however, in regions where frequent or heavy foot traffic occurs, it is often desirable to employ a layer of cementitious material as is obtained from a mixture of portland cement, sand and water or magnesium oxychloride cement and the like.

It is not essential that the protective layer be resistant to the passage of moisture, nor is it essential the insulating layer have a surface which prevents moisture from contacting the water resistant membrane.

Beneficially, in the fabrication of a roof, in accordance with the present invention, thermal insulating panels such as planks or sheets or cellular polystyrene or other cellular material are positioned adjacent each other in edge-to-edge relationship and no attempt had been made to seal the cracks or fissures therebetween. Indeed, in some installations employing incompletely cured or stabilized synthetic resinous foams, shrinkage of the foam occurs, wherein the foam cracks in random patterns similar to mud cracking and mortar on the surface thereof ruptures in a similar pattern. Such cracking does not appear to cause loss of serviceability or desirability of the roof structure.

Roof structures, in accordance with the invention, do not appear subject to damage by freezing of water in minor spaces between adjacent foam insulating elements. The foam insulating elements appear to have sufficient resilience to resist rupturing by the expansion of freezing water in crevices. Furthermore, in installations on a heated building the temperature adjacent the water resistant membrane usually does not reach freezing temperatures. In buildings having a roof applied in accordance with the present invention, little or no tendency is observed for moisture to condense on the inner surface of the roof deck.

By way of further illustration, a wooden roof deck was mopped with a roofing grade asphalt and a layer of 15 pound roofing felt applied thereto. The procedure was repeated until 4 layers of asphalt bonded roofing felt formed a water resistant membrane. A plurality of blocks of closed cell polystyrene foam measuring about 2 inches in thickness, 12 inches in width and about 8 feet long were adhered to the upper surface of the waterproof membrane by means of hot bitumen having a temperature of about 100° centigrade. A layer of mortar, about 3/16 of an inch thick was spread over the exposed surface of polystyrene foam. After an extended period of time, some cracking of the mortar was noted due to shrinkage of the polystyrene foam, however, the integrity of the water resistant membrane was in no way impaired. After an extended period of exposure, portions of the membrane were removed and evaluated for resiliency. The membrane disposed underneath the foam polystyrene installation appeared in excellent condition and exhibited no indication of undue hardening. By way of comparison, a similar membrane covered with gravel and having a 2 inch layer of cellular styrene disposed beneath the roof deck showed marked deterioration.

In a manner similar to the foregoing illustration, other beneficial and advantageous roofs are prepared by disposing closed cellular water resistant insulating material above a water impermeable membrane from a roof structure, such insulating materials, including foamed glass, foamed polyethylene, foamed copolymers of styrene-acrylonitrile and the like.

As is apparent from the foregoing specification, the present invention is susceptible of being embodied with various alterations and modification which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a built up roof consisting essentially of applying and affixing to a roof deck a water impermeable membrane disposing a plurality of closed cell water impermeable thermal insulating members *in coplanar disposition* having fissures therebetween above said water impermeable membrane on the upper side of the membrane and applying a water permeable protective layer [on] *consisting only of loose gravel spread directly over* the thermal insulating layer, *the exposed face and body of said protective layer and the interface of said protective layer with said thermal insulating layer being water permeable.*

[2. The method of claim 1, including the step of forming the water impermeable membrane from a plurality of layers of roofing felt and a bituminous adhesive.]

[3. The method of claim 1, including the step of adhering the insulating material to the water impermeable membrane.]

[4. The method of claim 1, wherein the protective layer is an inorganic mortar.]

5. A roof structure consisting essentially of a roof support means having a roof deck, the roof deck having an upper surface and a lower surface, the upper surface of the roof deck supporting a water impermeable membrane, the impermeable membrane having an upper face and a lower face being generally adjacent the roof deck, a thermal insulating layer disposed adjacent the upper face of the water impermeable membrane, the thermal insulating layer comprising a plurality of closed cell water impermeable insulating members *disposed in coplanar disposition and the members defining fissures between adjacent members* and the members defining fissures between adjacent members and a water permeable protective layer *consisting only of loose gravel spread directly over and* disposed on the surface of the insulating material remote from the roof deck, *the exposed face and body of said protective layer and the interface of said protective layer with said thermal insulation layer being water permeable.*

[6. The roof structure of claim 5, wherein the water impermeable layer comprises a plurality of layers of bituminous adhesive and roofing felt.]

[7. The roof of claim 5, wherein the insulating layer is a synthetic resinous closed cell foam.]

[8. The roof of claim 5, wherein the insulating material is adhered to the impermeable membrane.]

* * * * *

UNITED STATES PATENT AND TRADEMARK OFFICE

CERTIFICATE OF CORRECTION

PATENT NO. : Re. 31,007

DATED : August 10, 1982

INVENTOR(S) : John S. Best, deceased

It is certified that error appears in the above—identified patent and that said Letters Patent is hereby corrected as shown below:

Column 1, line 31, "roof." should read -- roofs. --.

Column 3, line 8, "isulating" should read -- insulating --.

Column 3, line 24, "weater" should read -- weather --.

Column 5, line 12, "membrane" should read -- membrane, --.

Column 6, lines 14 and 15, delete "and the members defining fissures between adjacent members".

Signed and Sealed this

*Eighth* Day of *February 1983*

[SEAL]

*Attest:*

GERALD J MOSSINGHOFF

*Attesting Officer*

*Commissioner of Patents and Trademarks*